US009462597B2

(12) United States Patent
Li et al.

(10) Patent No.: US 9,462,597 B2
(45) Date of Patent: Oct. 4, 2016

(54) METHOD AND APPARATUS FOR PROVIDING UPLINK CONTROL SIGNALLING IN A MULTI-RADIO ACCESS ENVIRONMENT

(75) Inventors: Zhenhong Li, Shanghai (CN); Haifeng Wang, Shanghai (CN); Wei Zou, Shanghai (CN); Gang Wu, Shanghai (CN)

(73) Assignee: Nokia Technologies Oy, Espoo (FI)

( * ) Notice: Subject to any disclaimer, the term of this patent is extended or adjusted under 35 U.S.C. 154(b) by 173 days.

(21) Appl. No.: 13/522,946

(22) PCT Filed: Jan. 20, 2010

(86) PCT No.: PCT/CN2010/070287
§ 371 (c)(1),
(2), (4) Date: Jul. 18, 2012

(87) PCT Pub. No.: WO2011/088612
PCT Pub. Date: Jul. 28, 2011

(65) Prior Publication Data
US 2012/0289170 A1  Nov. 15, 2012

(51) Int. Cl.
*H04B 1/38* (2015.01)
*H04W 72/08* (2009.01)
*H04W 72/04* (2009.01)
*H04W 88/10* (2009.01)

(52) U.S. Cl.
CPC ....... *H04W 72/085* (2013.01); *H04W 72/0413* (2013.01); *H04W 88/10* (2013.01)

(58) Field of Classification Search
CPC ......... H04W 72/1215; H04W 76/025; H04W 76/046; H04W 88/06; H04W 88/10
USPC .......................................................... 455/73
See application file for complete search history.

(56) References Cited

U.S. PATENT DOCUMENTS

| 2005/0135311 A1 | 6/2005 | Maillard |
| 2008/0045262 A1 | 2/2008 | Phan et al. |
| 2012/0300692 A1* | 11/2012 | Sfar et al. ............ 370/315 |

FOREIGN PATENT DOCUMENTS

| CN | 1638511 A | 7/2005 |
| CN | 101228805 A | 7/2008 |
| CN | 101473680 A | 7/2009 |
| WO | WO 2009/007217 A1 | 1/2009 |

OTHER PUBLICATIONS

Sachs et al., "Future Wireless Communication Based on Multi-Radio Access Networks", European Transactions on Telecommunications, vol. 20, Issue 3, Nov. 1, 2007, pp. 1-10.*

(Continued)

*Primary Examiner* — Nay A Maung
*Assistant Examiner* — Angelica M Perez
(74) *Attorney, Agent, or Firm* — Alston & Bird LLP

(57) ABSTRACT

Various methods for providing control signaling in a multi-radio access environment are provided. One example method includes implementing radio resource management and a general link layer jointly across at least two radio access technology modules, and selecting one of the radio access technology modules to perform control signaling in a multi-radio environment. Similar and related example methods and example apparatuses are also provided.

13 Claims, 10 Drawing Sheets

(56) References Cited

OTHER PUBLICATIONS

"3rd Generation Partnership Project; Technical Specification Group Services and System Aspects; Feasibility Study on 3GPP System to Wireless Local Area Network (WLAN) Interworking (Release 6)", 3GPP TR 22.934, V6.2.0, Sep. 2003, pp. 1-30.
Sachs et al., "Future Wireless Communication Based on Multi-Radio Access", Wireless World Research Forum, 2004, pp. 1-10.
Sachs et al., "Assessment of the Access Selection Gain in Multi-Radio Access Networks", European Transactions on Telecommunications, vol. 20, Issue 3, Nov. 1, 2007, pp. 265-279.
Koudouridis et al., "Multi-Radio Access in Ambient Network", IEEE INFOCOM, 2006, 5 pages.
Yaver et al., "Performance Evaluation of Multi-Radio Transmission Diversity: QoS Support for Delay Sensitive Services", IEEE 69th Vehicular Technology Conference, Apr. 26-29, 2009, pp. 1-5.
"3rd Generation Partnership Project; Technical Specification Group Radio Access Network; Physical Channels and Mapping of Transport Channels onto Physical Channels (FDD) (Release 8)", 3GPP TS 25.211, V8.4.0, Mar. 2009, pp. 1-56.
"3rd Generation Partnership Project; Technical Specification Group Radio Access Network; Multiplexing and Channel Coding (FDD) (Release 8)", 3GPP TS 25.212, V8.5.0, Mar. 2009, pp. 1-107.
"3rd Generation Partnership Project; Technical Specification Group Radio Access Network; Evolved Universal Terrestrial Radio Access (E-UTRA); Multiplexing and Channel Coding (Release 8)", 3GPP TS 36.212, V8.7.0, May 2009, pp. 1-60.
"3rd Generation Partnership Project; Technical Specification Group Radio Access Network; Evolved Universal Terrestrial Radio Access (E-UTRA); Physical Layer Procedures (Release 8)", 3GPP TS 36.213, V8.3.0, May 2008, pp. 1-45.
International Search Report and Written Opinion received for corresponding International Patent Application No. PCT/CN2010/070287, dated Nov. 4, 2010, 10 pages.
Office Action for Chinese Application No. 201080065160.4 dated Jul. 28, 2014.
Office Action for Chinese Application No. 201080065160.4 dated Feb. 15, 2015.
Office Action from corresponding Chinese Patent Application No. 2010800651604, dated Sep. 22, 2015.
Extended European Search Report for corresponding European Application No. 10843655.1 dated Jul. 14, 2016, 9 pages.
Koudouridis, G. P. et al., *Generic Link Layer Functionality for Multi-Radio Access Networks*, Retrieved from the Internet <URL: http://www.eurasip.org/Proceedings/Ext/IST05/papers/359.pdf>. (retrieved Jul. 1, 2008) 5 pages.
Magnusson, P. et al., *Radio Resource Management Distribution in a Beyond 3G Multi-Radio Access Architecture*, IEEE Communications Society, Globecom (2004), 3472-3477.

\* cited by examiner

METHOD AND APPARATUS FOR PROVIDING UPLINK CONTROL SIGNALLING IN A MULTI-RADIO ACCESS ENVIRONMENT

RELATED APPLICATION

This application was originally filed as PCT Application No. PCT/CN2010/070287 filed Jan. 20, 2010.

TECHNICAL FIELD

The present invention relates to multi-radio solutions and more particularly, but not exclusively, to providing uplink control signaling in a multi-radio access environment.

BACKGROUND

An increasing number of deployed radio access networks are based on different radio access technologies (RATs). The availability of multiple access alternatives offers the flexibility of using different RATs and the capability of increasing the overall transmission capacity, providing better service quality, and reducing the deployment costs for wireless access. In the future, a mixture of heterogeneous radio technologies may be available. Presently, mobile terminals have the capability for versatile usage of radio communication resources, such as Extended GSM (Global System for Mobile communications) (EGSM), High Speed Packet Access (HSPA), Wireless Local Area Network (WEAN), BlueTooth (BT), and the like. Some considerations involve utilizing several access techniques simultaneously.

Multi-radio access technologies have been given substantial attention recently. A modern base station platform can expand its supported technologies to cover GSM/Enhanced Data Rates for GSM Evolution (EDGE), wideband code division multiple access (WCDMA)/high speed packet access (HSPA) and long term evolution (LTE), all running concurrently in a single unit. Base stations may support a multi-radio access technology in order to meet the needs of new and existing $2^{nd}$ generation and $3^{rd}$ generation operators, who can use their existing infrastructure to deploy new network-wide technologies via simple software upgrades to $3^{rd}$ generation or LTE.

SUMMARY

Example methods and example apparatuses are described herein that provide for control signaling in a multi-radio access environment. In this regard, according to some example embodiments of the present invention, a device, such as a mobile terminal or a base station, may couple multi-radio resource management and a general link layer across multiple radio access technology modules. Additionally, a selection of a radio access technology module may be performed based on, for example, the link quality with respect to each of the radio access technology modules and associated connections. Due to the selection of a single radio access technology module for control signaling, various modifications to communications performance may be realized.

Various example methods and apparatuses of the present invention are described herein, including example methods that provide for control signaling in multi-radio access environments. One example method includes implementing radio resource management and a general link layer jointly across at least two radio access technology modules, and selecting one of the radio access technology modules to perform control signaling in a multi-radio environment.

An additional example embodiment is an apparatus configured for implementing control signaling in multi-radio access environments. The example apparatus comprises at least one processor and at least one memory including computer program code, the at least one memory and the computer program code configured to, with the at least one processor, cause the apparatus to perform various functionality. The example apparatus may be caused to perform implementing radio resource management and a general link layer jointly across at least two radio access technology modules, and selecting one of the radio access technology modules to perform control signaling in a multi-radio environment.

Another example embodiment is computer program product comprising a computer-readable storage medium having computer program code stored thereon, wherein execution of the computer program code causes an apparatus to perform various functionalities. Execution of the computer program code may cause an apparatus to perform implementing radio resource management and a general link layer jointly across at least two radio access technology modules, and selecting one of the radio access technology modules to perform control signaling in a multi-radio environment.

Another example apparatus includes means for implementing radio resource management and a general link layer jointly across at least two radio access technology modules, and means for selecting one of the radio access technology modules to perform control signaling in a multi-radio environment.

BRIEF DESCRIPTION OF THE DRAWINGS

The invention will be described, by way of example only, with reference to the accompanying drawings, in which.

DETAILED DESCRIPTION

Figure 1A:
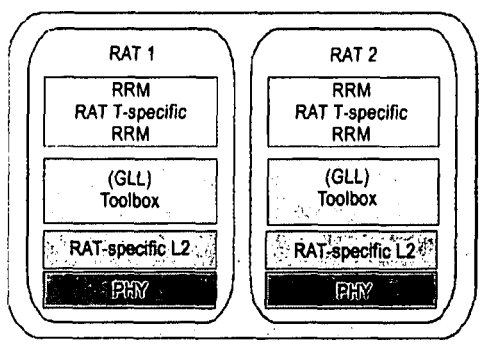
FIGS. 1a-1d depict examples of coupling options between RATs according to various example embodiments of the present invention.

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments of the present invention, to refer to data capable of being transmitted, received, operated on, and/or stored.

As used herein, the term 'circuitry' refers to all of the following: (a) hardware-only circuit implementations (such as implementations in only analog and/or digital circuitry); (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

According to various example embodiments of the present invention, a wireless communications device may support the use of two or more radio-access technologies (RATs), and the RATs may be partnered or coupled in a manner that supports communications and potentially increases throughput and user experience, given specific quality of service (QoS) requirements and constraints for each of the RATs. FIGS. 1a-1d depict four different examples of coupling options between multiple RATs. The radio-access technologies (RAT 1 and RAT 2) in FIGS. 1a-1d may be the same or different RATs. The RATs may be based, for example, on mobile $2^{nd}$ generation, $3^{rd}$ generation, long term evolution (LTE) technologies, or any other wired or wireless communications technologies, for example, wireless local area networking (WLAN), Bluetooth (BT), or the like. To facilitate communications in a multi-RAT device, the device may have access to network infrastructure that supports multiple radio access technologies including the ability to support transmission and reception to and from a device via multiple RATs.

FIGS. 1a-1d depict example multi-radio architectures that include protocol stacks configured to support various types of coupling. The protocol layers for each RAT may include a radio resource management (RRM) layer, a general link layer (GLL), a RAT-specific data link layer (L2), and a physical layer (PHY). According to various example embodiments, an RRM may be RAT-specific or coupled between RATs (e.g., RAT 1 and RAT 2). When coupled, the RRM may be referred to as a multi-radio resource management (MRRM or M-RRM) layer. The MRRM layer may handle access to radio resources of each RAT. The MRRM may comprise RAT coordination and network-complementing RRM functions. RAT coordination includes the principal coordination abilities, such as local/congestion control and radio-access (RA) selection. Network complementing RRM functions may be RAT-specific functions and may, for example, provide missing RRM functions to legacy or future networks or act as a translation layer between certain RA functions and RA intrinsic RRM functions.

The general link layer (GLL) may be separated or coupled to RAT 1 and RAT 2, and the GLL, may reside on top of the RAT-specific parts of the data link layer (L2). The GLL may be considered a toolbox of functions that would allow for the control and configuration of L2 functionality of different RATs for user data transmission. On the bottom, a physical layer (PHY) is present.

More specifically, FIG. 1a depicts protocols of an example multi-radio architecture in an example multi-radio protocol stack having "no coupling." In a "no coupling" configuration, no collaborative radio resource management (RRM) exists across the RATs, and no collaborative layer 2 functionality exists across the RATs.

Figure 1B:
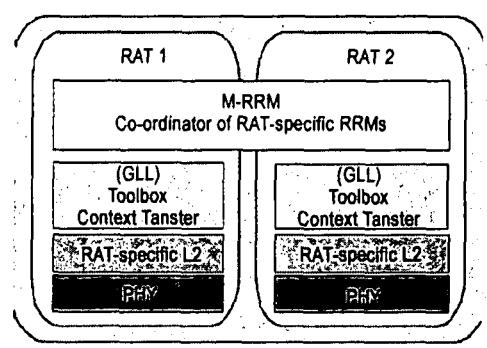

FIG. 1b depicts protocols of an example multi-radio architecture in an example multi-radio protocol stack having "loose coupling." In a "loose coupling" configuration, multi-radio resource management (MRRM (or M-RRM)) may be performed jointly across the RATs, and no other collaborative layers exist across the RATs. Each RAT may be associated with an optional GLL entity on top of the RAT-specific parts of the data link layer (L2). On the bottom, a physical layer (PHY) is present.

Figure 1C:
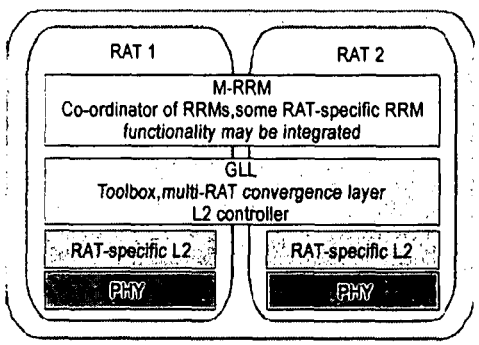

FIG. 1c depicts protocols of an example multi-radio architecture in an example multi-radio protocol stack having "tight coupling." In a "tight coupling" configuration, the MRRM may be performed jointly across the RATs. Some, but not necessarily all, of the RRM functionality for the different RATs may be integrated into the MRRM. In addition, the GLL provides a unified interface to the upper layers, acting as a multi-RAT convergence layer. In that way, the GLL function facilitates the co-operation among different access technologies.

Figure 1D:
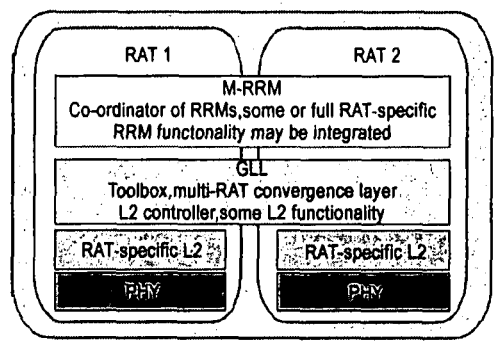

FIG. 1d depicts protocols of an example multi-radio architecture in an example multi-radio protocol stack having "very tight coupling." In a "very tight coupling" configuration, the MRRM is performed jointly across the RATs, and some, but not necessarily all, of the RRM functionality for the different RATs may be integrated into the MRRM. In addition to its role as a toolbox, convergence layer, and controller of RAT-specific layer 2 configurations, the GLL may not only control, but also complement certain layer 2 functionalities in order to more fully exploit the potential benefits of multi-radio accesses.

In certain example embodiments, certain L1/L2 function splitting mechanisms in multi-RAT operation (such as in a transmission or reception process) are provided. The splitting mechanisms can be applied, for example, in the "tight coupling" and "very tight coupling" examples to produce more tight coupling options.

According to various example embodiments, a device comprising multiple RATs (e.g., mobile terminal, base station, or the like) may be configured for simultaneous transmission and/or simultaneous reception over multiple RATs or selection of a particular RAT for a certain types of communications. The multi-radio architecture of a device may comprise a multi-radio resource management (MRRM) and a generic link layer (GLL), or similar protocols or functions common for the RATs concerned. In certain example embodiments, the MRRM may responsible for joint management of radio resource between the different RATs in a coordinated manner, and the GLL provides unified link level processing, offering a generic interface towards high layers and adaptation of the underlying RATs. The MRRM (implemented, for example, as an MRRM component such as a processor) may manage, in certain example embodiments, all the available radio access resources, enabling an overall coordination through the selection of the most appropriate RAT or RATs to serve each particular communications session.

Figure 2A:
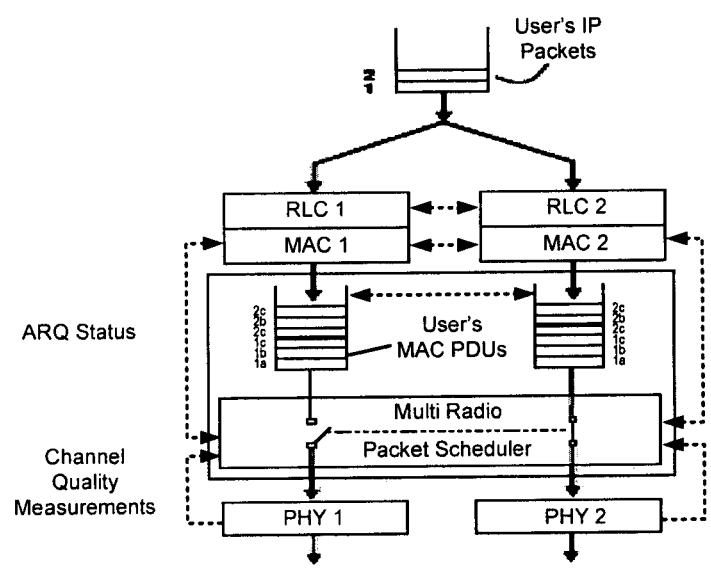
FIGS. 2a-2c depict multi-radio transmission diversity schemes in accordance with certain example embodiments.
Figure 2B:
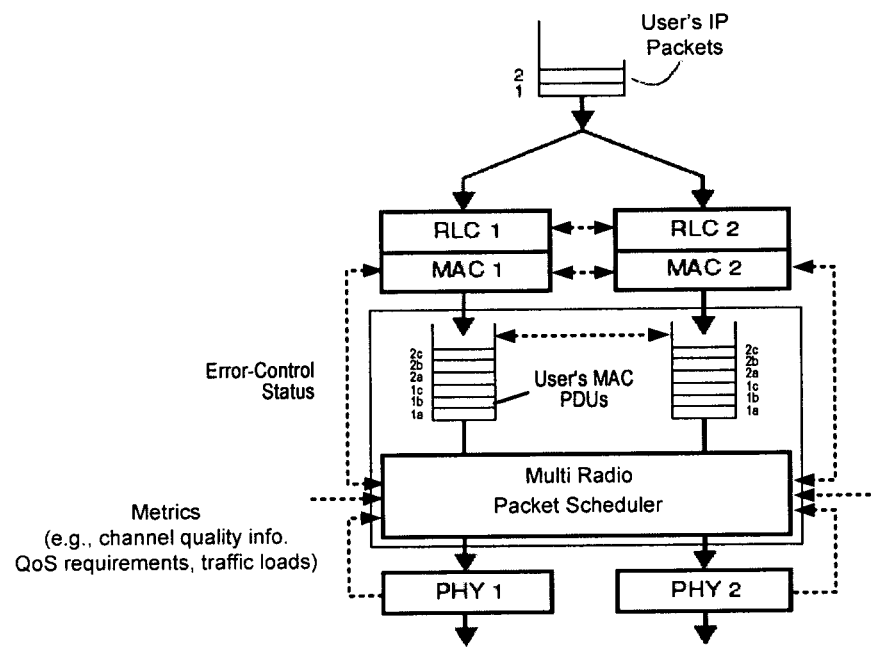
Figure 2B:
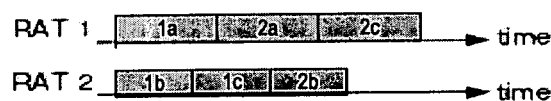
Figure 2C:
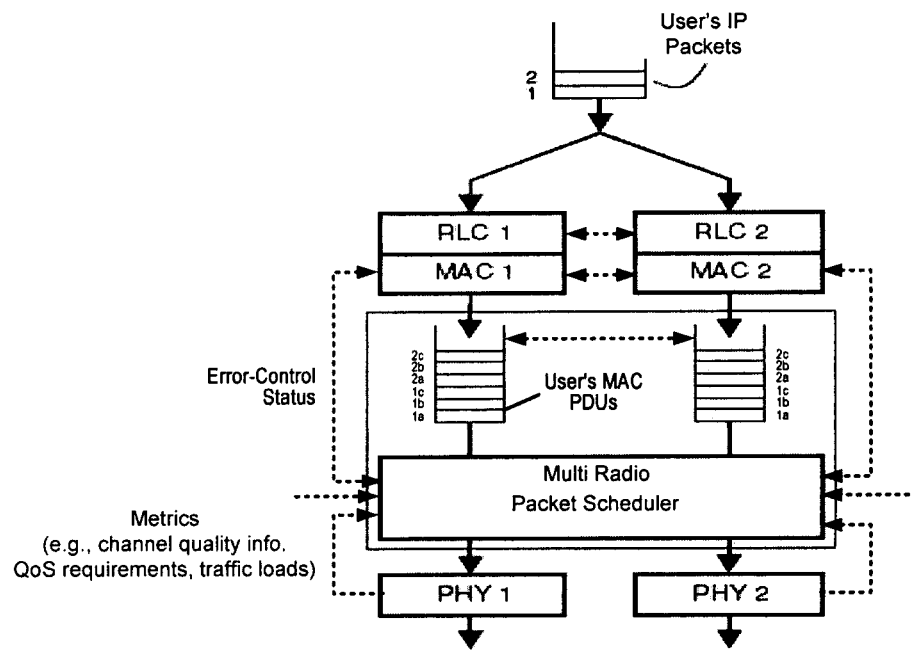
Figure 2C:
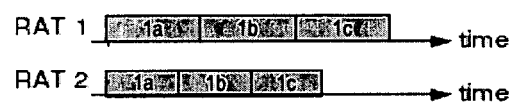

In addition to the various coupling architectures, a device having multiple RATs may also support a number of transmission diversity schemes as depicted in FIGS. 2a-2c. The transmission diversity schemes may include switching between RATs as depicted in FIG. 2a, parallel transmission without redundancy as depicted in FIG. 2b, and parallel with redundancy as depicted in FIG. 2c.

FIG. 2a illustrates a switched multi-radio transmission diversity (MRTD) or "switched" scheme with no redundancy and no parallelism. In this regard, one RAT is used to transmit an atomic data unit. The scheme, and the device implementing the scheme, relies upon feedback information from the network to choose a RAT by employing an adaptive mechanism based on chosen criteria. FIG. 2b illustrates a "parallel without redundancy" scheme, where alternating packets are transmitted over a multiplicity of RATs. According to some example embodiments, the "parallel without redundancy" scheme distributes data units over available accesses, and does not require any RAT selection specific feedback. FIG. 2c, on the other hand, depicts the "parallel with redundancy" scheme which involves the transmission of duplicate copies of packets over two or more RATs, and therefore poses maximum overhead while combining gain.

Based on the multi-RAT coupling and transmission diversity options described above, various example embodiments of the present invention support control signaling, including uplink control signaling, in multi-RAT environments. Some example embodiments utilize multi-radio resource management and general link layers that are shared between RATs, such as those described with respect to the tightly coupled and very tightly coupled architectures. Some example embodiments of the present invention perform uplink control signaling transmission in a multi-radio environment to fully utilize the available resources in each RAT simultaneously via MRRM and GLL functions as described above and otherwise herein.

In this regard, according to some example embodiments, uplink control signaling may be transmitted through one selected RAT of a multi-RAT device to increase the control signaling reliability by, for example, utilizing the RAT that is associated with the best link quality. Additionally, according to some example embodiments, compatibility with the currently existing systems can be maximized through the selection of a RAT for control signaling. As such, uplink feedback signaling over a selected RAT based on link quality may be performed. Further, via a multi-RAT device, joint configuration of the downlink channel quality indication (CQI) from some or all of the RATs may be implemented, as well as, encoding options for the downlink CQIs. Joint processing of acknowledgements and negative acknowledgements (ACK/NACK processing) may also be performed via a selected RAT. Further, expectation time setting of an ACK/NACK in the hybrid automatic repeat request (HARQ) transmission side may be performed. Selection of a RAT for these and other purposes, may be performed between RATs configured to support, for example, high speed downlink packet access (HSDPA) or LTE. According to some example embodiments, WLAN uplink control signaling transmissions may also be provided via RAT selection as described herein. While some example embodiments using HSDPA WCDMA and LTE is provided herein, it is contemplated that any communications techniques could be utilized in accordance with various embodiments of the present invention.

In view of the makeup and utilization of the control signaling as described herein, some example embodiments of the present invention may be further explained. In this regard, according to some example embodiments, the combination of the high speed dedicated physical control channel (HS-DPCCH) signaling in WCDMA HSDPA and the physical uplink control channel (PUCCH) in LTE may be considered as one example in a multi-RAT environment.

Figure 3:
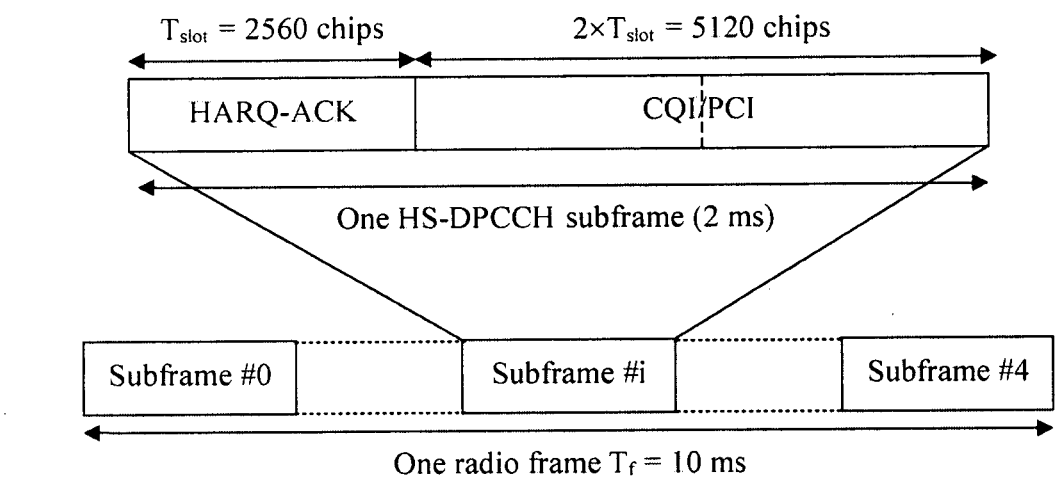
FIG. 3 depicts a frame structure in accordance with certain example embodiments.

In a WCDMA HSDPA system, the high speed dedicated physical control channel (HS-DPCCH) may carry uplink feedback signaling related to downlink high speed downlink shared channel (HS-DSCH) transmission and to high speed shared control channel (HS-SCCH) orders. The feedback signaling may include HARQ acknowledgement (HARQ-ACK) and CQI. In a specific example embodiment, each sub frame of length 2 milliseconds (3'2560 chips) includes 3 slots, each of length 2560 chips. The HARQ-ACK may be carried in the first slot of the HS-DPCCH sub-frame. The CQI, and, in the case where the user equipment (UE) (e.g., a mobile terminal) is configured in MIMO (multiple in multiple out) mode, also the priority class identifier (PCI), may be carried in the second and third slot of a HS-DPCCH sub-frame. This configuration is illustrated in FIG. 3. The CQI may be coded using, for example, a (20,5) code. The HARQ acknowledgement message to be transmitted may be coded to 10 bits.

In comparison, in LTE systems, the uplink control signal may be transmitted either on the physical uplink control channel (PUCCH) or physical uplink shared channel (PUSCH). When the control signaling is to be transmitted in a sub-frame in which the UE has been allocated transmission resources for the PUSCH, the control signaling may be multiplexed together with the uplink shared channel (UL-SCH) data. In that case, the uplink control information may be transmitted on the PUSCH. According to some example embodiments, the PUCCH is not transmitted simultaneously with the PUSCH from the same UE. The PUCCH may support multiple formats, ACK/NACK, CQI, scheduling requests, and the combinations thereof.

Additional, HARQ acknowledgement bits may be received from higher layers. Each positive acknowledgement (ACK) may be encoded as a binary '0' and each negative acknowledgement (NACK) may be encoded as a binary '1'. The binary bit may be mapped on a binary phase shift keyed (BPSK) symbol and the BPSK symbol may be multiplied with a cyclically shifted sequence of length equal to, for example, 12.

The channel quality bits input to the channel coding block may be denoted by $a_0, a_1, a_2, a_3, \ldots, a_{A-1}$ where A is the number of bits. The number of channel quality bits may depend on the transmission format. The CQI may be coded using a (20, A) code.

In view of this, according to various example embodiments, the uplink control signaling for the HSDPA and LTE is similar. Both HSDPA and LTE take the form of CQI+ACK/NACK.

Figure 4A:
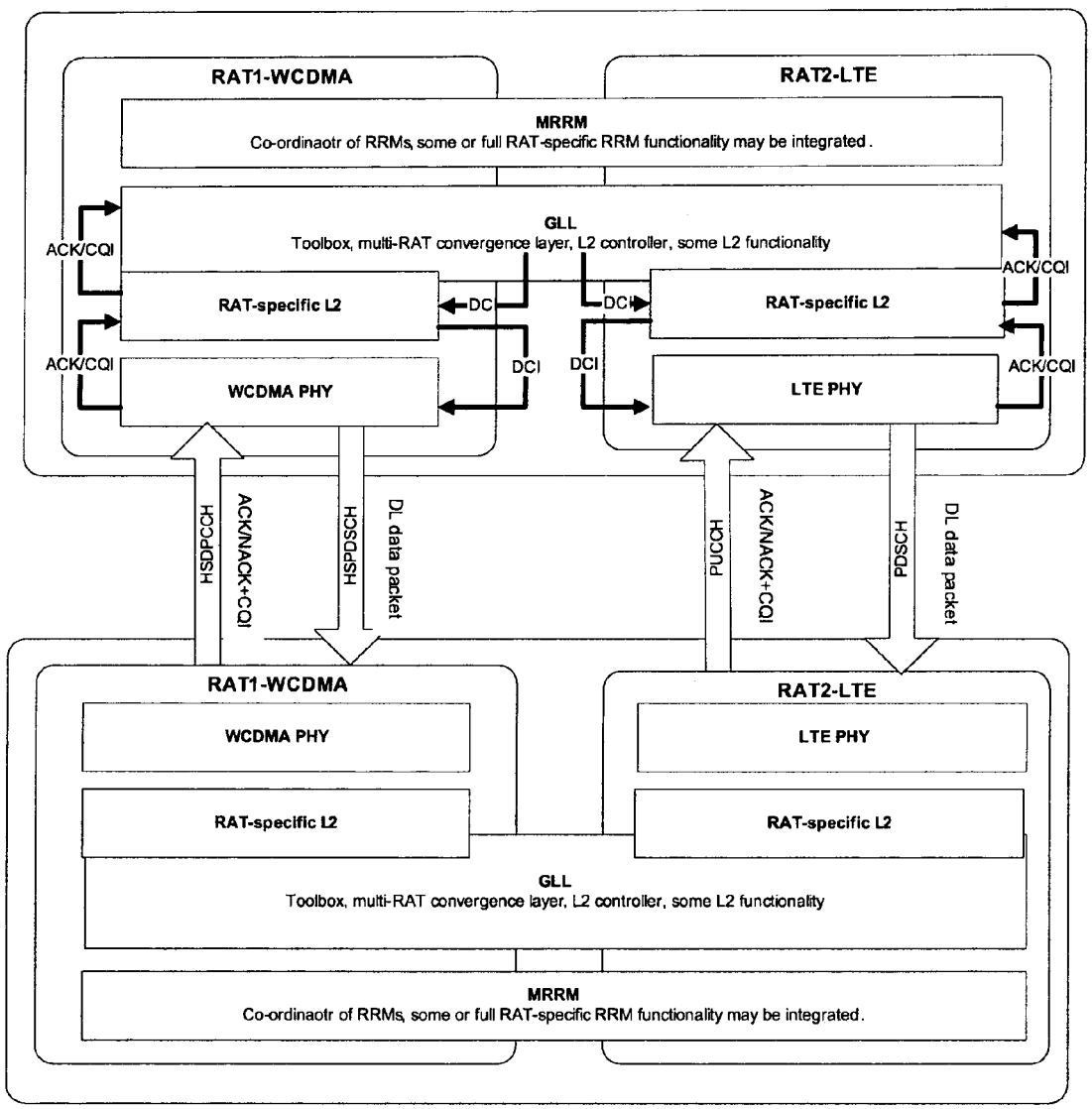
FIG. 4a-4c depicts RAT configurations for control signaling according to certain example embodiments.

In the multi-radio systems, such as an HSDPA and LTE system, one way to implement control signaling may be to transmit the HS-DPCCH via the HSDPA air interface and the PUCCH via the LTE interface, as illustrated in FIG. 4a. When the WCDMA PHY receives and decodes the HS-DPCCH and the LTE PHY layer receives and decodes the PUCCH, the PHY layers may send the received information elements to the RAT-specific L2 and the GLL. GLL may make a joint scheduling decision and a retransmission decision. RAT-specific L2 and PHY may send a downlink data packet to a corresponding RAT air interface according to the multi-radio transmission diversity modes as described above.

On the other hand, in another example embodiment, improvements may be realized over the separated scheme described above and depicted in FIG. 4a. In this regard, link quality, resource saving, implementation complexity in the multi-radio communication systems may be considered to optimize signaling transmission and reception via a selected air interface and associated RAT. According to some example embodiments, since uplink control information is important for the system performance and uplink control information may be associated with costly overhead, reliable link quality and overhead efficiency are desirable attributes.

Figure 4B:
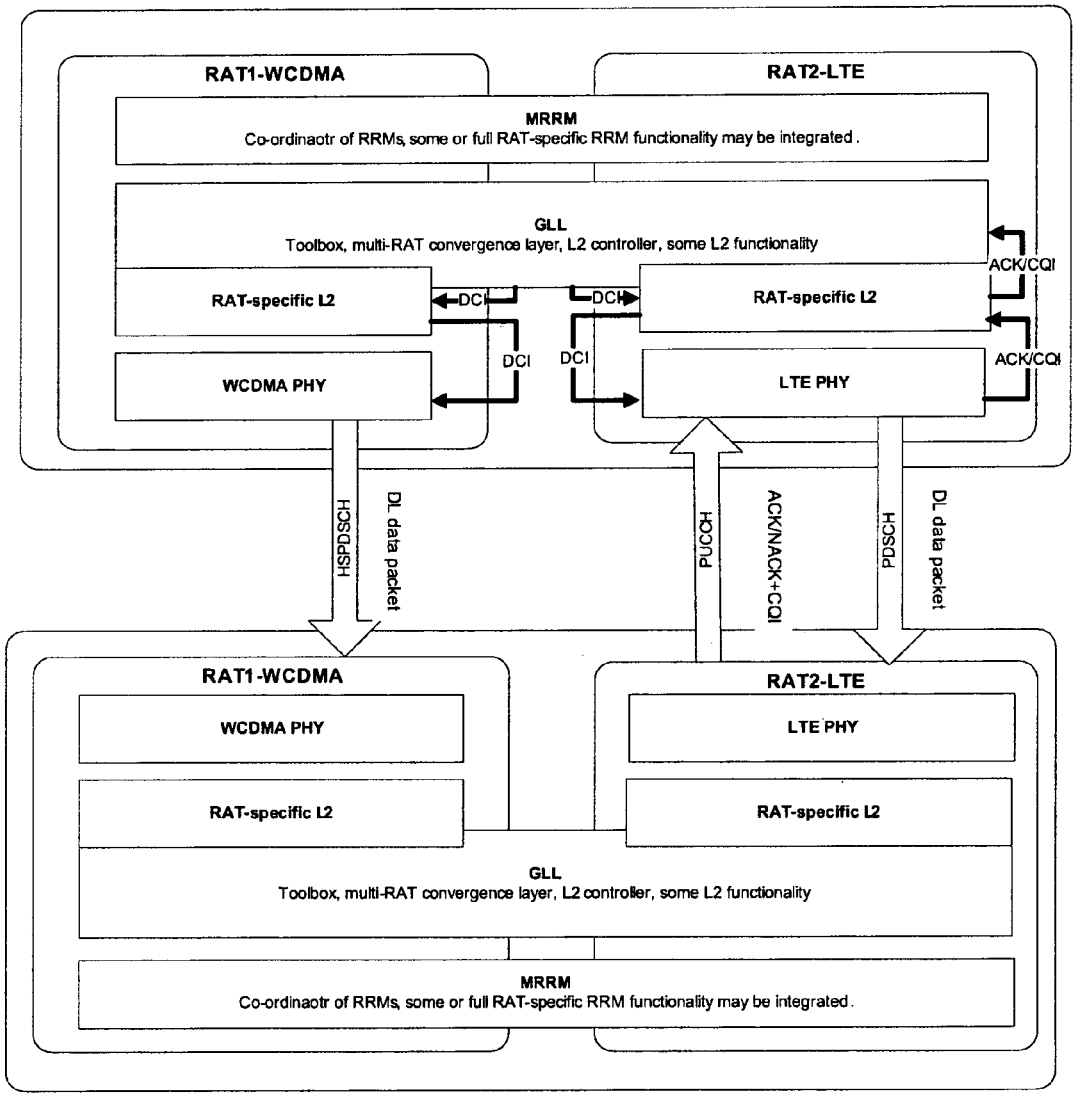
Figure 4C:
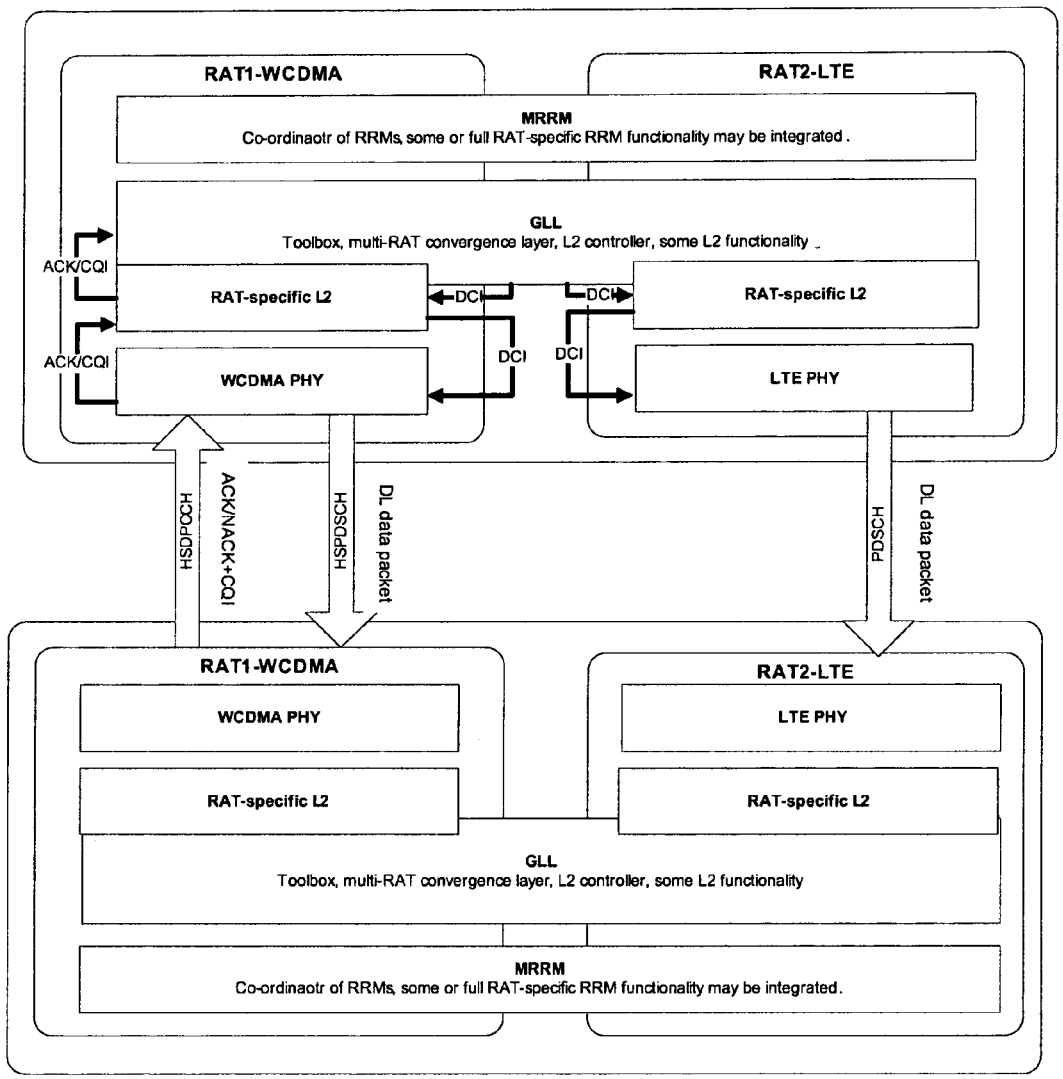

Some example embodiments that consider these attributes may provide for transmission of the uplink control signaling via one selected air interface and associated RAT. The selection criteria may be based on, for example, link quality as well as other factors. In this regard, according to some example embodiments, from the perspective of the uplink control signaling structure, no obstacles exist in the multi-radio communication systems for implementing different multi-radio transmission modes. As such, through the use of RAT-specific CQI, the link quality on each RAT may be determined. In this regard, FIG. 4b depicts an example configuration where an LTE RAT has been selected for control signaling. FIG. 4c, on the other hand, depicts an example configuration where an WCDMA/HSDPA RAT has been selected for control signaling.

Further, the frequency of the CQI information generation and reception may be configured in the higher layers and encoded for example, to 20 bits for both HSDPA and LTE systems. The ACK/NACK feedback structure may also depend on the multi-radio transmission mode, and the interfaces between the GLL and RAT specific L2 may be simplified through the use of a single selected air interface and associated RAT.

According to various example embodiments, CQI transmissions may be performed via a single, selected RAT. In this regard, the base station (e.g., e-node B) may select one RAT for HSDPA and LTE CQI transmission and configure the CQI transmission frequency based on an uplink reference signal.

If HSDPA HS-DPCCH is selected for the CQI transmission, HS-CQI may be configured by the CQI feedback cycle and CQI repetition factor. The CQI feedback cycle (e.g., [0, 1, 5, 20, 20, 20, 40, 80 transmission time interval (TTI)]), which is signaled to the UE, may control how often the UE transmits new CQI information on the uplink. A value of zero may mean that the UE does not transmit any CQI information. A CQI repetition factor (e.g., [1, 2, 3, 4]), which is also signaled to the UE, may control how often the UE repeats CQI information in the consecutive HS-DPCCH sub-frames. LTE-CQI may be configured by the same parameters as those of the HS-CQI. However, according to some example embodiments, since the number of the CQI bits for HSDPA and LTE are 5 and 4, respectively, different options for the CQI encoding may be used.

If the LTE RAT is selected for the CQI transmission, LTE-CQI may be configured by [0, 2, 5, 10, 16, 20, 32, 40, 64, 80, 160] milliseconds. Additionally, the HS-CQI may be configured by the same parameters as those of LTE-CQI.

The frequency of the HS-CQI and LTE-CQI may be configured by the higher layers, such as the GLL. The minimum CQI cycle may be 4 milliseconds for both HS-CQI and LTE-CQI. For multi-RAT systems, the HS-CQI and LTE-CQI may be transmitted, for example, in turn in every 2 milliseconds. In this regard, the 1st TTI may be for HS-CQI and 2nd TTI may be for LTE-CQI or vice versa. Alternatively, the frequency of the uplink CQI may be doubled for each HS-CQI and LTE-CQI. Accordingly, as the HS-CQI and LTE-CQI is transmitted on a selected RAT, more frequent CQI transmission may be configured for other UE at home system in a needed base.

Additionally, coding options for CQIs may also be available through utilization of a single, selected RAT. In accordance with a first option, LTE-CQI and HS-CQI may be coded separately according to respective RATs, since the encoding and decoding rules for the HSPDA and LTE are not the same. However, the coded bits may be mapped according to the rules of the selected RAT. Accordingly, this option may require one RAT to have two CQI encoding and decoding units.

In accordance with a second option, if the LTE RAT is selected for uplink control transmission, the LTE-CQI may be coded with an LTE specific (20,A) encoder and the HS-CQI may be coded with an LTE specific (20, A=5) encoder. Alternatively, if the HS RAT is selected for uplink control transmission, the HS-CQI may be coded with an LTE specific (20, A=5) encoder and the LTE-CQI may be coded with LTE specific (20, A) encoder. Further, if the HS RAT is selected, the HS-CQI may alternatively be coded with an HS specific (20, 5) encoder.

In accordance with a third option, a new encoder common for both LTE-CQI and HS-CQI may be designed. The common encoder may have a length of 40. The longer coding length may provide an improved coding gain.

Since a CQI is radio access technology dependent, a UE may need to measure the CQI for each link. After CQI measuring in a RAT-specific PHY, a CQI may be transmitted in the selected RAT according to the configuration rule from the higher layers. At the receiving side, the CQIs may be decoded in the selected RAT's PHY and forwarded to the layer 2 and GLL as the input information for packet scheduling in the GLL. After the packet scheduling in the GLL, the downlink control information (DCI) may be forwarded from the GLL to the RAT specific L2 and the PHY to format the downlink packet transmission.

In addition to performing CQI transmission and encoding with respect to a selected RAT, example embodiments of the present invention may also perform HARQ acknowledgement transmission via a single, selected RAT. In this regard, a base station (e.g., e-Node B) may select one RAT for HSDPA and LTE HARQ acknowledgement transmission according to the selected RAT's transmission mechanism and the multi-radio transmission modes. In the switched mode, for example as depicted in FIG. 2a, at a given instant in time, only one HARQ packet may be received, and as such, one HARQ acknowledgement may be needed in uplink. The transmission mechanism for the HARQ acknowledgment may be based on the mechanism employed by the selected RAT.

Alternatively, in a parallel without redundancy mode, as depicted in FIG. 2b, different packets may be transmitted from each RAT. As such, the HARQ acknowledgement may be packet/RAT dependent. If the HSDPA RAT is selected as the transmission RAT for uplink control signaling, the ACK/NACK corresponding to each RAT may be coded as illustrated in Table 1, for example. A different coding scheme may also be considered. If the LTE RAT is selected as the transmission RAT for uplink control signaling, HARQ-ACK may consist of 2-bits of information, corresponding to the ACK/NACK bit for RAT1 and a corresponding ACK/NACK bit for RAT2, and the bits may be mapped to quadrature phase-shift keying (QPSK) modulation as illustrated in Table 2, for example.

TABLE 1

Channel coding of HARQ-ACK in multi-radio transmission mode (HSDPA)

| HARQ-ACK message to be transmitted | | $w_0$ | $w_1$ | $w_2$ | $w_3$ | $w_4$ | $w_5$ | $w_6$ | $w_7$ | $w_8$ | $w_9$ |
|---|---|---|---|---|---|---|---|---|---|---|---|
| RAT1 | RAT2 | | | | | | | | | | |
| ACK | ACK | 1 | 0 | 1 | 0 | 1 | 1 | 1 | 1 | 0 | 1 |
| ACK | NACK | 1 | 1 | 0 | 1 | 0 | 1 | 0 | 1 | 1 | 1 |
| NACK | ACK | 0 | 1 | 1 | 1 | 1 | 0 | 1 | 0 | 1 | 1 |
| NACK | NACK | 1 | 0 | 0 | 1 | 0 | 0 | 1 | 0 | 0 | 0 |

TABLE 2

Channel coding and mapping of HARQ-ACK in multi-radio transmission mode (LTE)

| HARQ-ACK | $b(0), \ldots, b(M_{bit} - 1)$ | $d(0)$ |
|---|---|---|
| (RAT1, RAT2) | 00 | −1 |
| | 01 | j |
| | 10 | −j |
| | 11 | 1 |

Alternatively, for the parallel with redundancy mode, as depicted in FIG. 2c, the same packet may be transmitted from each RAT. The HARQ acknowledgement may therefore be common to each RAT, and there may be only one HARQ feedback required from a resource efficiency point of view. The ACK/NACK transmission mechanism may be based on the selected RAT's mechanism.

The uplink ACK/NACK may correspond to whether the downlink packet is correctly received at the UE side, and the downlink HARQ may be asynchronous in LTE and HSDPA. Since the frame structure for HSDPA and LTE is different, a synchronization issue may arise for uplink ACK/NACK. However, the synchronization issue may be avoided and rectified via the following.

The reception and processing of the ACK/NACK may be assumed to be allocated in the GLL. The ACK/NACK expectation time may be set according to the frame structure and receiving node processing time. In the switched mode, after the UE receives the downlink packet, the UE may decode the data packet from one RAT within the pre-defined time interval of UE processing time. According to the decoded result, the UE may transmit the uplink ACK/NACK in the selected RAT. The base station PHY may decode the uplink control signal and forward the result to the GLL. The downlink packet and the corresponding uplink control signal may be transmitted via the same RAT, and therefore, the synchronization problem may be avoided. If the downlink packet and the corresponding uplink control signal are not transmitted in the same RAT, then the ACK/NACK expectation time at the base station side may be modified according to the selected RAT and the timing difference between the two RATs.

If a parallel without redundancy mode is utilized, after the UE receives the downlink packets, the UE may decode the data packet from both RATs within the pre-defined time interval of the UE processing time in each RAT. According to the decoding result, the UE may transmit the packet dependent uplink ACK/NACK in a selected RAT. The base station PHY may decode the uplink control signal and forward the result to the GLL. The ACK/NACK expectation time in the base station side may be set according to the selected RAT and the timing difference between two RATs.

If a parallel with redundancy mode is utilized, after the UE receives the downlink packets, UE may decode the data packet from both RATs, if needed, within the pre-defined time interval of the UE processing time in each RAT. Once the data packet is correctly decoded, or both packets are decoded if the 1st arriving packet fails, the decoding process may stop at UE side. According to the decoding result, the UE may transmit the uplink ACK/NACK in the selected RAT. The base station PHY may decode the uplink control signal and forward the result to the GLL. The ACK/NACK expectation time in the base station side may be set according to the selected RAT, and the timing difference between two RATs, which may be larger than or equal to the larger expectation time of the two RATs.

Figure 5:
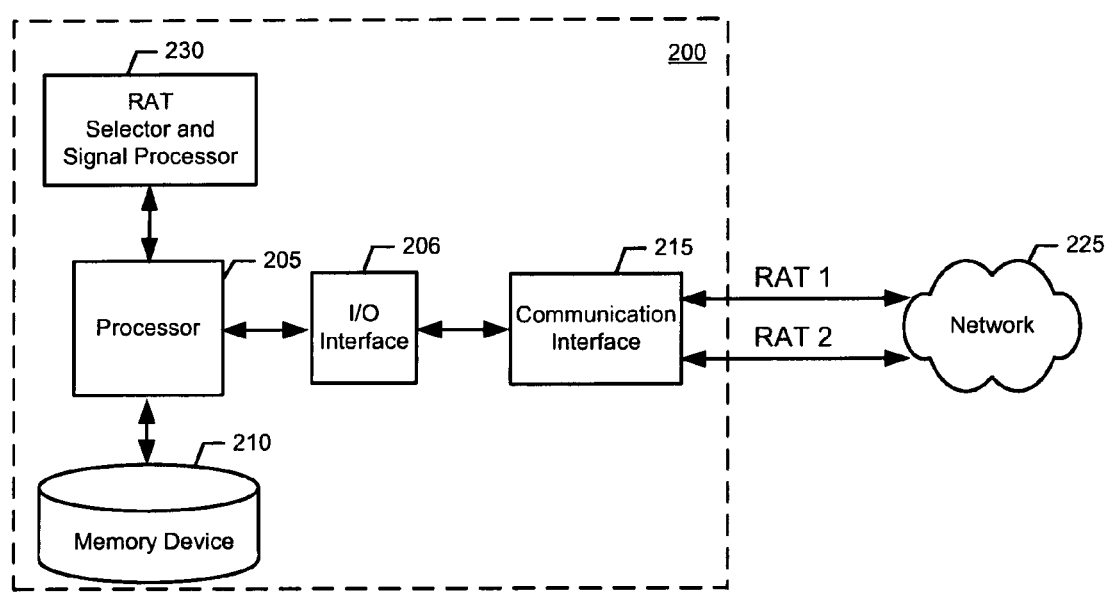
FIG. 5 depicts a block diagram of an apparatus for performing control signaling in multi-radio access environments.

Referring now to FIG. 5, an example embodiment of the present invention is the apparatus 200. Apparatus 200 may, be embodied as, or included as a component of, a communications device with wired or wireless communications capabilities. In some example embodiments, the apparatus 200 may be part of a communications device, such as a stationary or a mobile communications terminal. As a stationary communications terminal, such as an infrastructure node (e.g., access point, base station, or the like), the apparatus 200 may be part of, or embodied as, a server, a computer, communications switching device, or the like. As a mobile device or terminal, the apparatus 200 may be a mobile and/or wireless communications node such as, for example, a mobile and/or wireless server, computer, access point, communications switching device, handheld device (e.g., telephone, portable digital assistant (PDA), mobile television, gaming device, camera, video recorder, audio/video player, radio, and/or a global positioning system (GPS) device), any combination of the aforementioned, or the like. Regardless of the type of communications device, apparatus 200 may also include computing capabilities.

The example apparatus 200 includes or is otherwise in communication with a processor 205, a memory device 210, an Input/Output (I/O) interface 206, a communications interface 215, and a RAT selector and signal processor 230. The processor 205 may be embodied as various means for implementing the various functionalities of example embodiments of the present invention including, for example, a microprocessor, a coprocessor, a controller, a special-purpose integrated circuit such as, for example, an ASIC (application specific integrated circuit), an FPGA (field programmable gate array), or a hardware accelerator, processing circuitry or the like. According to one example embodiment, processor 205 may be representative of a plurality of processors, or one or more multiple core processors, operating in concert. Further, the processor 205 may be comprised of a plurality of transistors, logic gates, a clock (e.g., oscillator), other circuitry, and the like to facilitate performance of the functionality described herein. The processor 205 may, but need not, include one or more accompanying digital signal processors. In some example embodiments, the processor 205 is configured to execute instructions stored in the memory device 210 or instructions otherwise accessible to the processor 205. The processor 205 may be configured to operate such that the processor causes the apparatus 200 to perform various functionalities described herein.

Whether configured as hardware or via instructions stored on a computer-readable storage medium, or by a combination thereof, the processor 205 may be an entity capable of performing operations according to embodiments of the present invention while configured accordingly. Thus, in example embodiments where the processor 205 is embodied as, or is part of, an ASIC, FPGA, or the like, the processor 205 is specifically configured hardware for conducting the operations described herein. Alternatively, in example embodiments where the processor 205 is embodied as an executor of instructions stored on a computer-readable storage medium, the instructions specifically configure the processor 205 to perform the algorithms and operations described herein. In some example embodiments, the processor 205 is a processor of a specific device (e.g., mobile terminal) configured for employing example embodiments of the present invention by further configuration of the processor 205 via executed instructions for performing the algorithms, methods, and operations described herein.

The memory device 210 may be one or more computer-readable storage media that may include volatile and/or non-volatile memory. In some example embodiments, the memory device 210 includes Random Access Memory (RAM) including dynamic and/or static RAM, on-chip or off-chip cache memory, and/or the like. Further, memory device 210 may include non-volatile memory, which may be embedded and/or removable, and may include, for example, read-only memory, flash memory, magnetic storage devices (e.g., hard disks, floppy disk drives, magnetic tape, etc.), optical disc drives and/or media, non-volatile random access memory (NVRAM), and/or the like. Memory device 210 may include a cache area for temporary storage of data. In this regard, some or all of memory device 210 may be included within the processor 205.

Further, the memory device 210 may be configured to store information, data, applications, computer-readable program code instructions, and/or the like for enabling the processor 205 and the example apparatus 200 to carry out various functions in accordance with example embodiments of the present invention described herein. For example, the memory device 210 could be configured to buffer input data for processing by the processor 205. Additionally, or alternatively, the memory device 210 may be configured to store instructions for execution by the processor 205.

The I/O interface 206 may be any device, circuitry, or means embodied in hardware, software, or a combination of hardware and software that is configured to interface the processor 205 with other circuitry or devices, such as the communications interface 215. In some example embodiments, the processor 205 may interface with the memory 210 via the I/O interface 206. The I/O interface 206 may be configured to convert signals and data into a form that may be interpreted by the processor 205. The I/O interface 206 may also perform buffering of inputs and outputs to support the operation of the processor 205. According to some example embodiments, the processor 205 and the I/O interface 206 may be combined onto a single chip or integrated circuit configured to perform, or cause the apparatus 200 to perform, various functionalities of the present invention.

The communication interface 215 may be any device or means embodied in either hardware, a computer program product, or a combination of hardware and a computer program product that is configured to receive and/or transmit data from/to a network 225 and/or any other device or module in communication with the example apparatus 200. The communications interface may be configured to communicate information via any type of wired or wireless connection, and via any type of communications protocol. The communications interface 215 may be configured to support the operation of a number of RAT modules (e.g., a HSDPA RAT module, an LTE RAT module, and the like) and communications via the RATs (E.g., RAT 1 and RAT 2). A RAT module may include all of the hardware and software for implementing the a protocol stack as described herein. Processor 205 may also be configured to facilitate communications via the communications interface by, for example, controlling hardware included within the communications interface 215. In this regard, the communication interface 215 may include, for example, communications driver circuitry (e.g., circuitry that supports wired communications via, for example, fiber optic connections), one or more antennas, a transmitter, a receiver, a transceiver and/or supporting hardware, including, for example, a processor for enabling communications. Via the communication interface 215, the example apparatus 200 may communicate with various other network entities in a device-to-device fashion and/or via indirect communications via a base station, access point, server, gateway, router, or the like.

The RAT selector and signal processor 230 of example apparatus 200 may be any means or device embodied, partially or wholly, in hardware, a computer program product, or a combination of hardware and a computer program product, such as processor 205 implementing stored instructions to configure the example apparatus 200, memory device 210 storing executable program code instructions configured to carry out the functions described herein, or a hardware configured processor 205 that is configured to carry out the functions of the RAT selector and signal processor 230 as described herein. In an example embodiment, the processor 205 includes, or controls, the RAT selector and signal processor 230. The RAT selector and signal processor 230 may be, partially or wholly, embodied as processors similar to, but separate from processor 205. In this regard, the RAT selector and signal processor 230 may be in communication with the processor 205. In various example embodiments, the RAT selector and signal processor 230 may, partially or wholly, reside on differing apparatuses such that some or all of the functionality of the RAT selector and signal processor 230 may be performed by a first apparatus, and the remainder of the functionality of the RAT selector and signal processor 230 may be performed by one or more other apparatuses.

The apparatus 200 and the processor 205 may be configured to perform the following functionality via the RAT selector and signal processor 230. The RAT selector and signal processor 230 may be configured to cause the processor 205 and/or the apparatus 200 to perform various functionalities, such as those depicted in the flowchart of FIG. 6 and as generally described herein. In this regard, the RAT selector and signal processor 230 may be configured to implement radio resource management and a general link layer jointly across at least two radio access technology modules at 300, and select one of the radio access technology modules to perform control signaling in a multi-radio environment at 310. According to some example embodiments, selecting one of the radio access technology modules to perform control signaling includes selecting one of the radio access technology modules to perform control signaling, where the control signaling is uplink feedback control signaling. Further, according to some example embodiments, selecting one the radio access technology modules includes selecting one the radio access technology modules based on radio specific channel quality indications.

The RAT selector and signal processor 230 may also be configured to generate channel quality indication transmissions based on a configuration of the selected radio access technology module at 320, and encode channel quality indications based on a configuration of the selected radio access technology module at 330. In this regard, a configuration of a radio access technology module may be WCDMA HSDPA, LTE, or the like.

Further, according to some example embodiments, the RAT selector and signal processor 230 may be configured to perform joint processing of acknowledgments and negative acknowledgements via the selected radio access technology module based on a configuration of the selected radio assess technology module and a multi-radio transmission diversity scheme at 340. According to still other example embodiments, the RAT selector and signal processor 230 is configured to implement an expectation time for acknowledgements and negative acknowledgements based on based on a configuration of the selected radio assess technology module and a multi-radio transmission diversity scheme at 350.

Figure 6:
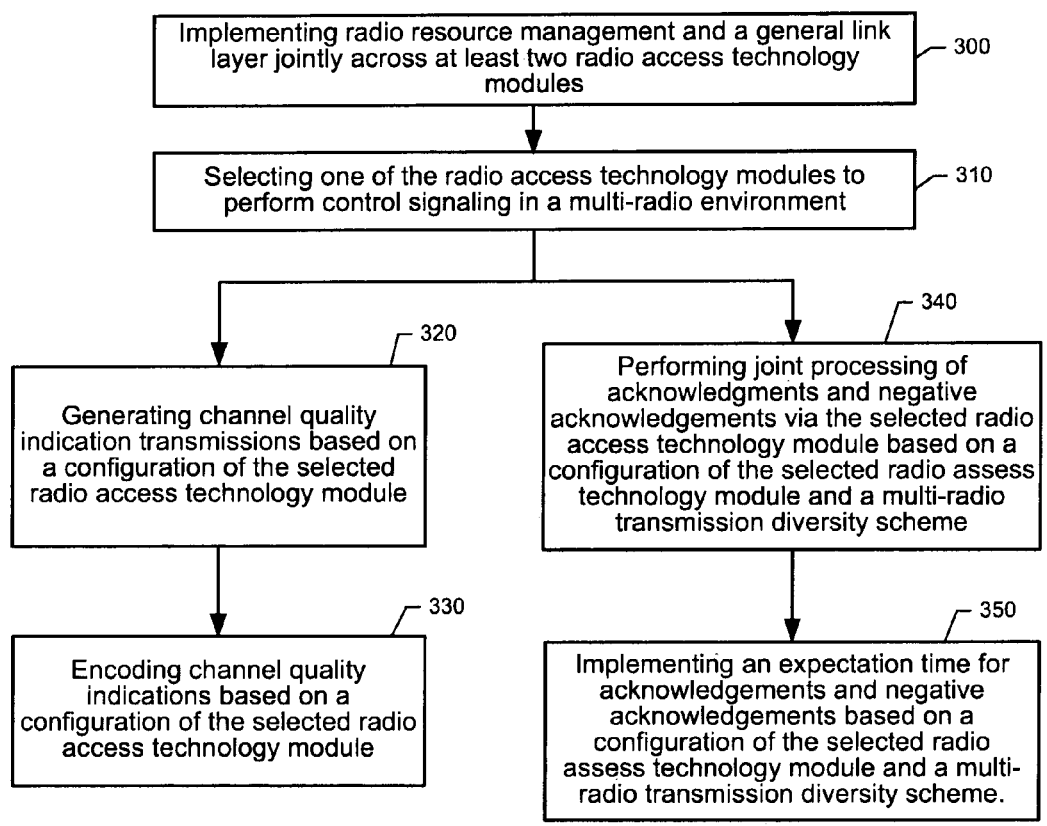
FIG. 6 depicts a flowchart for performing control signaling in multi-radio access environments

As depicted in FIG. 6 and as otherwise described herein, the RAT selector and signal processor 230 may be configured to perform parallel operations in accordance with various embodiments. In this regard, the RAT selector and signal processor 230 may be configured to generate the channel quality indication transmissions at 320 and encode the channel quality indications at 330, in parallel with performing joint processing of acknowledgments and negative acknowledgments at 340 and implementing the expectation time for acknowledgments and negative acknowledgments at 350.

FIG. 6 illustrates flowcharts of example systems, methods, and/or computer program products according to example embodiments of the invention. It will be understood that each operation of the flowcharts, and/or combinations of operations in the flowcharts, can be implemented by various means. Means for implementing the operations of the flowcharts, combinations of the operations in the flowchart, or other functionality of example embodiments of the present invention described herein may include hardware, and/or a computer program product including a computer-readable storage medium (as opposed to a computer-readable transmission medium which describes a propagating signal) having one or more computer program code instructions, program instructions, or executable computer-readable program code instructions stored therein. In this regard, program code instructions may be stored on a memory device, such as memory device 210, of an example apparatus, such as example apparatus 200, and executed by a processor, such as the processor 205. As will be appreciated, any such program code instructions may be loaded onto a computer or other programmable apparatus (e.g., processor 205, memory device 210, or the like) from a computer-readable storage medium to produce a particular machine, such that the particular machine becomes a means for implementing the functions specified in the flowcharts' operations. These program code instructions may also be stored in a computer-readable storage medium that can direct a computer, a processor, or other programmable apparatus to function in a particular manner to thereby generate a particular machine or particular article of manufacture. The instructions stored in the computer-readable storage medium may produce an article of manufacture, where the article of manufacture becomes a means for implementing the functions specified in the flowcharts' operations. The program code instructions may be retrieved from a computer-readable storage medium and loaded into a computer, processor, or other programmable apparatus to configure the computer, processor, or other programmable apparatus to execute operations to be performed on or by the computer, processor, or other programmable apparatus. Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the computer, processor, or other programmable apparatus provide operations for implementing the functions specified in the flowcharts' operations.

Accordingly, execution of instructions associated with the operations of the flowchart by a processor, or storage of instructions associated with the blocks or operations of the flowcharts in a computer-readable storage medium, support combinations of operations for performing the specified functions. It will also be understood that one or more operations of the flowcharts, and combinations of blocks or operations in the flowcharts, may be implemented by special purpose hardware-based computer systems and/or processors which perform the specified functions, or combinations of special purpose hardware and program code instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. A method comprising:
implementing, via a device configured to communicate wirelessly, radio resource management and a general link layer jointly across at least two radio access technology modules;
selecting one of the radio access technology modules to perform control signaling in a multi-radio environment;
generating channel quality indication transmissions and encoding channel quality indications based on a configuration of the selected radio access technology module;
implementing an expectation time for acknowledgements and negative acknowledgements based on a configuration of the selected radio access technology module and a multi-radio transmission diversity scheme; and
performing joint processing of the acknowledgements and the negative acknowledgements via the selected radio access technology module,
wherein generating channel quality indication transmissions and encoding channel quality indications are performed in parallel with joint processing of the acknowledgements and the negative acknowledgements and implementing the expectation time for the acknowledgements and the negative acknowledgements.

2. The method of claim 1, wherein selecting one of the radio access technology modules to perform control signaling includes selecting one of the radio access technology modules to perform control signaling, the control signaling being uplink feedback control signaling.

3. The method of claim 1 wherein selecting one of the radio access technology modules includes selecting one of the radio access technology modules based on radio specific channel quality indications.

4. The method of claim 1 wherein performing joint processing of the acknowledgments and the negative acknowledgements is based on a configuration of the selected radio access technology module and the multi-radio transmission diversity scheme.

5. An apparatus comprising at least one processor and at least one memory including computer program code, the at least one memory and the computer program code configured to, with the at least one processor, cause the apparatus at least to:

implement radio resource management and a general link layer jointly across at least two radio access technology modules;

select one of the radio access technology modules to perform control signaling in a multi-radio environment;

generate channel quality indication transmissions and encoding channel quality indications based on a configuration of the selected radio access technology module;

implement an expectation time for acknowledgements and negative acknowledgements based on a configuration of the selected radio access technology module and a multi-radio transmission diversity scheme; and perform joint processing of the acknowledgements and the negative acknowledgements via the selected radio access technology module, wherein generate channel quality indication transmissions and encoding channel quality indications are performed in parallel with joint processing of the acknowledgements and the negative acknowledgements and implement the expectation time for the acknowledgements and the negative acknowledgements.

6. The apparatus of claim 5, wherein the apparatus caused to select one of the radio access technology modules to perform control signaling includes being caused to select one of the radio access technology modules to perform control signaling, the control signaling being uplink feedback control signaling.

7. The apparatus of claim 5, wherein the apparatus caused to select one of the radio access technology modules includes being caused to select one of the radio access technology modules based on radio specific channel quality indications.

8. The apparatus of claim 5, wherein perform joint processing of the acknowledgments and the negative acknowledgements is based on a configuration of the selected radio access technology module and the multi-radio transmission diversity scheme.

9. The apparatus of claim 5, wherein the apparatus is caused to generate channel quality indication transmissions and encode channel quality indications, in parallel with joint processing of the acknowledgments and the negative acknowledgements and implementing the expectation time for the acknowledgements and the negative acknowledgements.

10. The apparatus of claim 5, wherein the apparatus comprises a mobile terminal or an infrastructure node.

11. The apparatus of claim 5 further comprising a communications interface including at least two radio access technology modules.

12. A computer program product comprising a non-transitory computer readable storage medium having computer program code stored thereon, the computer program code configured to, when executed, cause an apparatus to:

implement radio resource management and a general link layer jointly across at least two radio access technology modules;

select one of the radio access technology modules to perform control signaling in a multi-radio environment;

generate channel quality indication transmissions and encoding channel quality indications based on a configuration of the selected radio access technology module;

implement an expectation time for acknowledgements and negative acknowledgements based on a configuration of the selected radio access technology module and a multi-radio transmission diversity scheme; and perform joint processing of the acknowledgements and the negative acknowledgements via the selected radio access technology module, wherein generate channel quality indication transmissions and encoding channel quality indications are performed in parallel with joint processing of the acknowledgements and the negative acknowledgements and implement the expectation time for the acknowledgements and the negative acknowledgements.

13. The computer program product of claim 12, wherein the computer program code configured to cause the apparatus to select one of the radio access technology modules to perform control signaling includes being configured to cause the apparatus to select one of the radio access technology modules to perform control signaling, the control signaling being uplink feedback control signaling.

* * * * *